United States Patent [19]
Turnock et al.

[11] 3,857,661
[45] Dec. 31, 1974

[54] MANUFACTURE OF CERAMIC WARE

[75] Inventors: Frederick Arthur Turnock; Robert Gater, both of Stoke-on-Trent, England

[73] Assignee: Service (Engineers) Limited, Staffordshire, England

[22] Filed: Oct. 12, 1973

[21] Appl. No.: 405,810

[52] U.S. Cl. .............................................. 425/289
[51] Int. Cl. .......................................... B29c 17/12
[58] Field of Search .......... 425/383, 445, 806, 289; 264/161

[56] References Cited
UNITED STATES PATENTS
2,356,002  8/1944  Plumley et al. ................. 425/806 X
2,908,936  10/1959  Kilborn ........................ 264/161 X Primary Examiner—Roy Lake
Assistant Examiner—Craig R. Feinberg
Attorney, Agent, or Firm—Ralph D. Gelling; Vincent A. White; Richard B. Megley

[57] ABSTRACT

The invention described is a machine for deseaming cup handles in the manufacture of ceramic ware. A cup handle is placed on a sponge and pushed into a passageway in the sponge by a pusher member thereby rubbing seams off the cup handle against the walls of the passageway. An ejector member then pushes the handle back out of the passageway onto the sponge so that, as the handle has been pushed an equal distance in each direction the completed handle is symmetrical.

4 Claims, 6 Drawing Figures

3,857,661

MANUFACTURE OF CERAMIC WARE

BACKGROUND OF THE INVENTION

It is customary in the ceramics industry, when manufacturing cups with handles, for the cup and the handle to be moulded separately and later joined together before firing of the clay takes place. Cup handles made separately from the cups to which they are to be attained usually have small ridges, referred to as seams, along both sides thereof which are caused by imperfectly joined mould halves being used for moulding the handles. These seams would be unsightly if they appeared on a finished cup and so it is customary for them to be removed prior to the attaching of the handles to cups.

The method used in removing seams from cup handles, at present, is usually for an operator to wipe both sides of the handle with, for example, a damp sponge. This method requires considerable skill in the operator to avoid distortion of the handle during wiping and occupies considerable time. It has been previously recognised that it is desirable to replace this wiping operation by a machine which can be operated without requiring great skill in the operator and which will rapidly remove seams from cup handles without causing distortion thereof. Such machines have been proposed in the past but have proved unsatisfactory in operation.

One previously proposed machine passed handles through a die plate which removed the bulk of material in the seams and then through a slot in a sponge which smoothed the handle. This machine was slow to load and unload and led to an unsatisfactory handle which had become unsymmetrical, about the plane defined by the positions which the seams occupied, as more clay was removed from the leading edge of the handle than from the trailing edge, and the machine was, as far as we are aware, not commercially successful.

BRIEF SUMMARY OF THE INVENTION

It is one of the various objects of the present invention to provide a machine suitable for use in removing seams from cup handles which gives handles which are symmetrical and not otherwise distorted from their moulded shape.

It is another of the various objects of the present invention to provide a deseaming machine which can be loaded and unloaded easily and rapidly.

With the above and other objects in view, as will hereinafter appear, the present invention in one aspect thereof contemplates a deseaming machine for cup handles comprising a support for sponge material or the like in the form of a box with a hole in its bottom. A cube-shaped sponge (by the word sponge herein is meant not only natural sponge but also synthetic substitutes therefor) is supported by this box and has a passageway therethrough. The properties desirable in the sponge are that it should be resilient and of small cell-size so as to ensure a smooth finish on a treated cup handle. The machine described hereinafter with reference to the accompanying drawings has four of these supports mounted on a turntable so that they can be indexed between various stations of the machine.

Each of the four cube-shaped sponges of the machine described with reference to the accompanying drawings has a passageway in it which has a cross-sectional configuration conforming to the profile shape of the cup handles to be operated upon by each sponge and have entry portions vertically above the holes in the bottom of the boxes.

At one of the stations of the machine a pusher member is located and at a second station an ejector member is located. In the operation of the machine, a cup handle is placed in the entry portion of the passageway of one of the sponges and is indexed by means of the turntable to the station at which the pusher member is located.

The pusher member of the machine is shaped to conform to the cross-sectional configuration of the passageway and arranged to push the handle into the passageway when relative movement takes place between the box in which the sponge is supported and the pusher member due to the operation of a pneumatic cylinder which brings the pusher member down to contact the handle and push it into the passageway. The handle is pushed through part of the passageway and the seams thereof rub against the walls of the passageway. The pusher member than is retracted leaving the handle in the passageway.

The turntable then indexes the handle to the station at which the ejector member is located, which ejector member has the same shape as the pusher member. The ejector member passes through the hole in the bottom of the box and pushes the handle back out of the passageway; the pushing of the handle first in one direction and then in the opposite direction through the passageway ensures that the treated handle is substantially symmetrical about the plane defined by the positions which the seams occupied. Pneumatic cylinders provide means for moving the pusher and ejector members into and out of the passageway.

Figure 1:
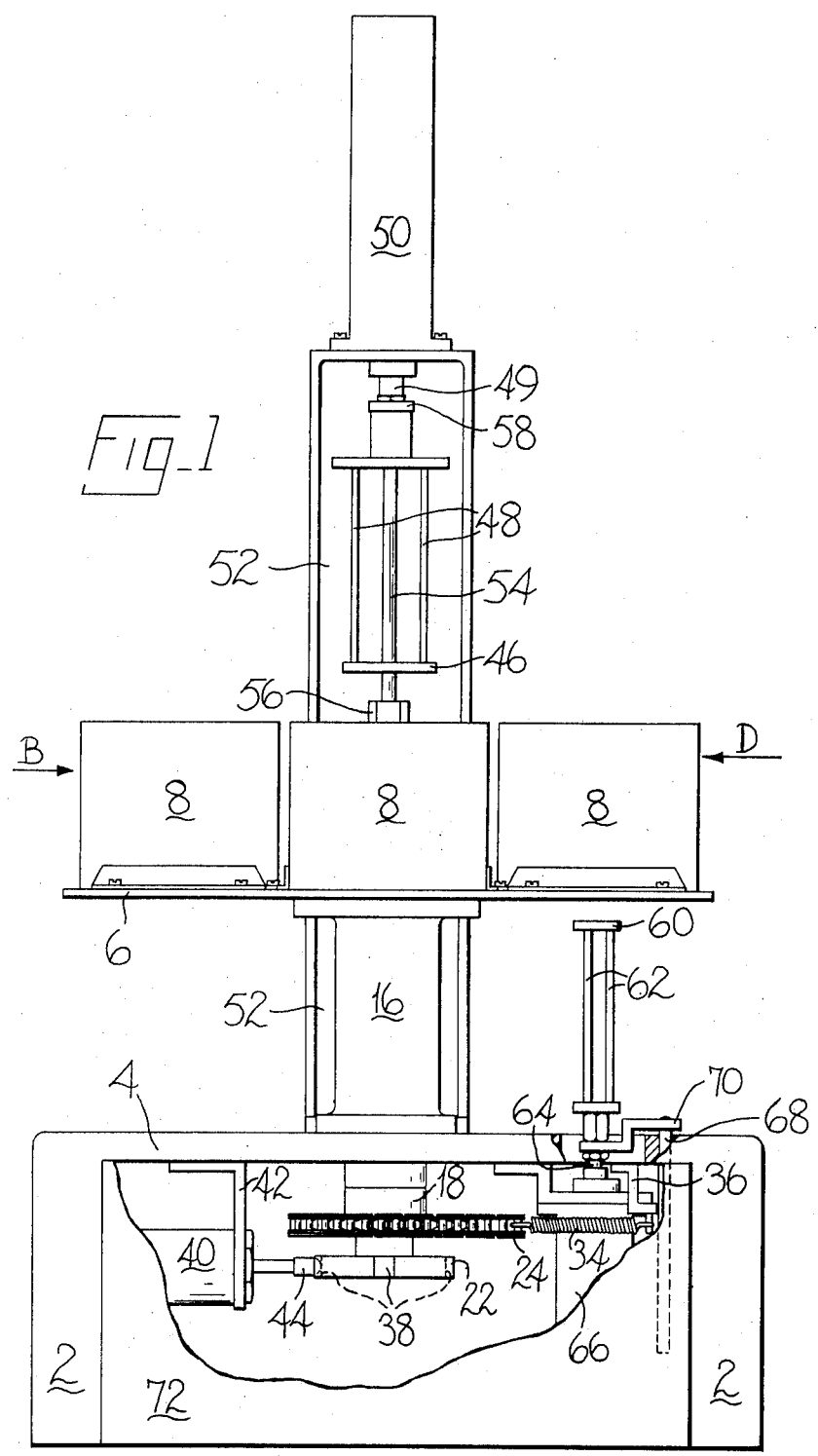
FIG. 1 is a front-elevational view of a machine embodying the invention with the control box thereof broken away.

The machine shown in the accompanying drawings comprises four legs 2 which support a base plate 4 of the machine. A turntable 6 is rotatably mounted on the base plate 4 and carries four boxes 8 disposed symmetrically about the periphery of the turntable 6.

The boxes 8 are square and at the bottom of each is a square hole which passes through the turntable 6 centrally of the boxes but leaving a lip around the bottom of the boxes on which a sponge 10 is supported. The sponges 10 supported in the boxes are cubic in form and are of small cell structure such as is used in the upholstery industry. Each sponge has a passageway 12 through it whose cross-sectional configuration conforms to the profile of a cup handle to be operated upon by the machine; that is the cross-sectional shape of the passageway is the same shape as the cross-sectional shape of the handle taken in the plane of the seams of the handle but of smaller width. The passageway 12 can be prepared by outlining the profile of the handle onto the surface of the sponge and cutting through the sponge with a hot wire inside the profile so that the passageway 12 is narrower than the handle, for example if the handle is five-sixteenth inch in width, a width of one-eighth inch to one-sixteenth inch would be suitable for the passageway. It is not necessary that the sponges 10 should be integral as the passageways 12 may be formed at the junction of two sponges. Furthermore, if it desired to operate the machine on a closed or D-shaped cup handle, the passageway 12 may be formed between two sponges one of which is encircled by the passageway 12. In this case it is necessary to provide the inner sponge with an interior support such as a metal rod in order to maintain a uniform cross-section in the passageway.

The sponges 10 are easily removable from the boxes 8 in which they rest on the lips at the bottom thereof so that they can be readily replaced to allow the machine to be used for different shaped handles. When the machine is to be used, the sponges 10 are made damp. When the sponges 10 are positioned in the boxes 8, the passageways 12 run vertically with the bottom ends thereof above the holes through the turntable 6. The top ends of the passageways 12 are widened to form tapering entry portions 14 with outwardly tapering walls. These entry portions 14 provide seats for the cup handles to be operated upon.

The turntable 6 is supported by an axle 16 which is rotatably mounted in the base plate 4 and has keyed to it below the level of the base plate a sprag clutch 18, a cog wheel 20 and a positioning disc 22. The sprag clutch 18 is also mounted below the base plate 4 and ensures that the turntable 6 can only be rotated in one direction but allows the cog wheel 20 to rotate in either direction. The cog wheel 20 is meshed with a chain 24, motion of which rotates the cog wheel 20. If the chain 24 causes the cog wheel 20 to rotate in one direction, the turntable 6 rotates also but, if the rotation is in the other direction, the turntable 6 remains stationary.

The chain 24 passes from the cog wheel 20 to an idler cog wheel 26, which is mounted for free rotation on the underside of the base plate 4, and thence to a pneumatic cylinder 28 to the piston rod of which the chain is connected. The cylinder 28 is mounted on a bracket 30 which depends from the base plate 4 and is provided with a stop 32 which limits the motion of its piston rod. The other end of the chain 24 is connected to a spring 34 which is mounted on a bracket 36 depending from the base plate 4.

Figure 2:
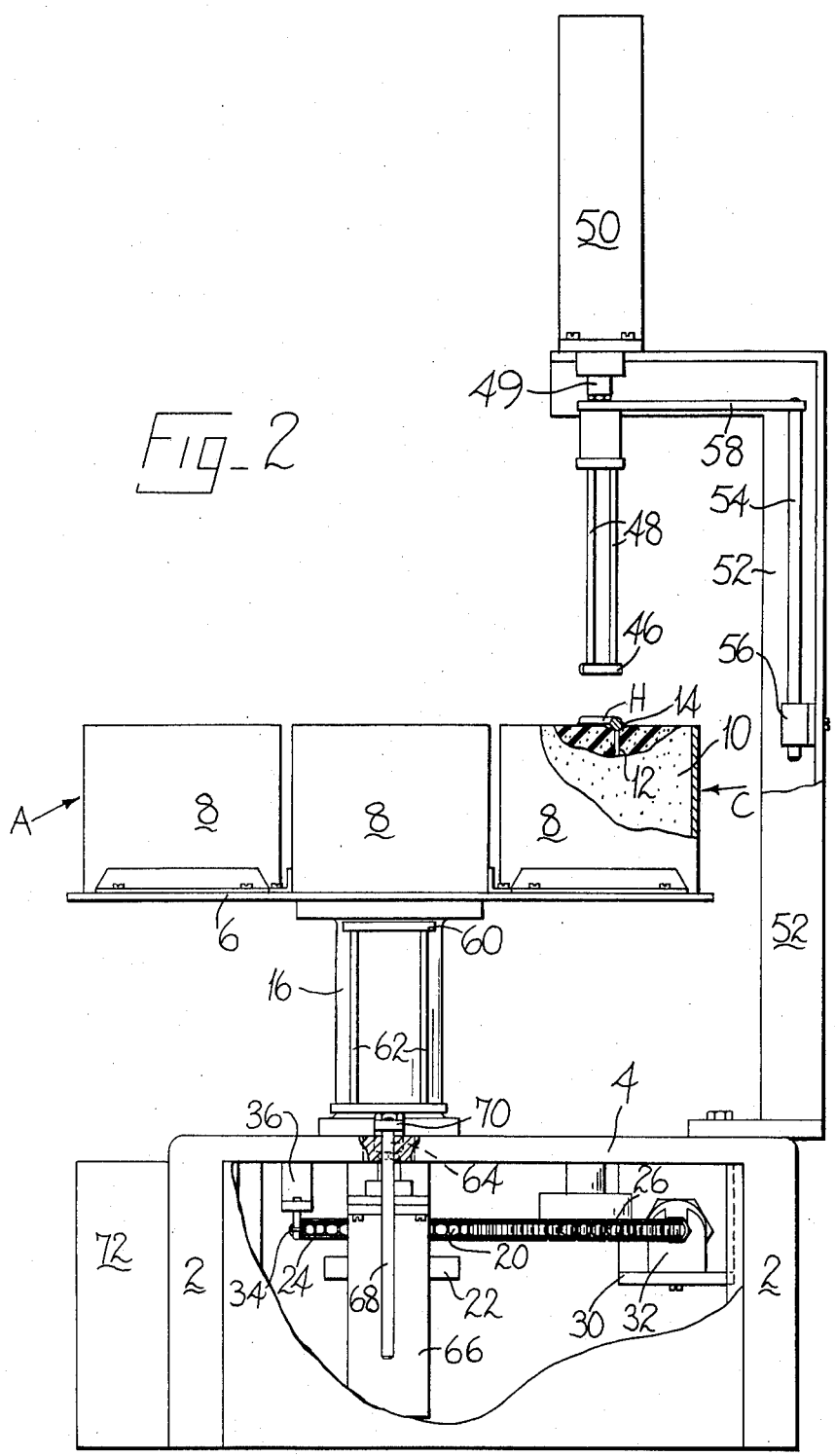
FIG. 2 is a right-hand side-elevational view of the machine shown in FIG. 1.
Figure 3:
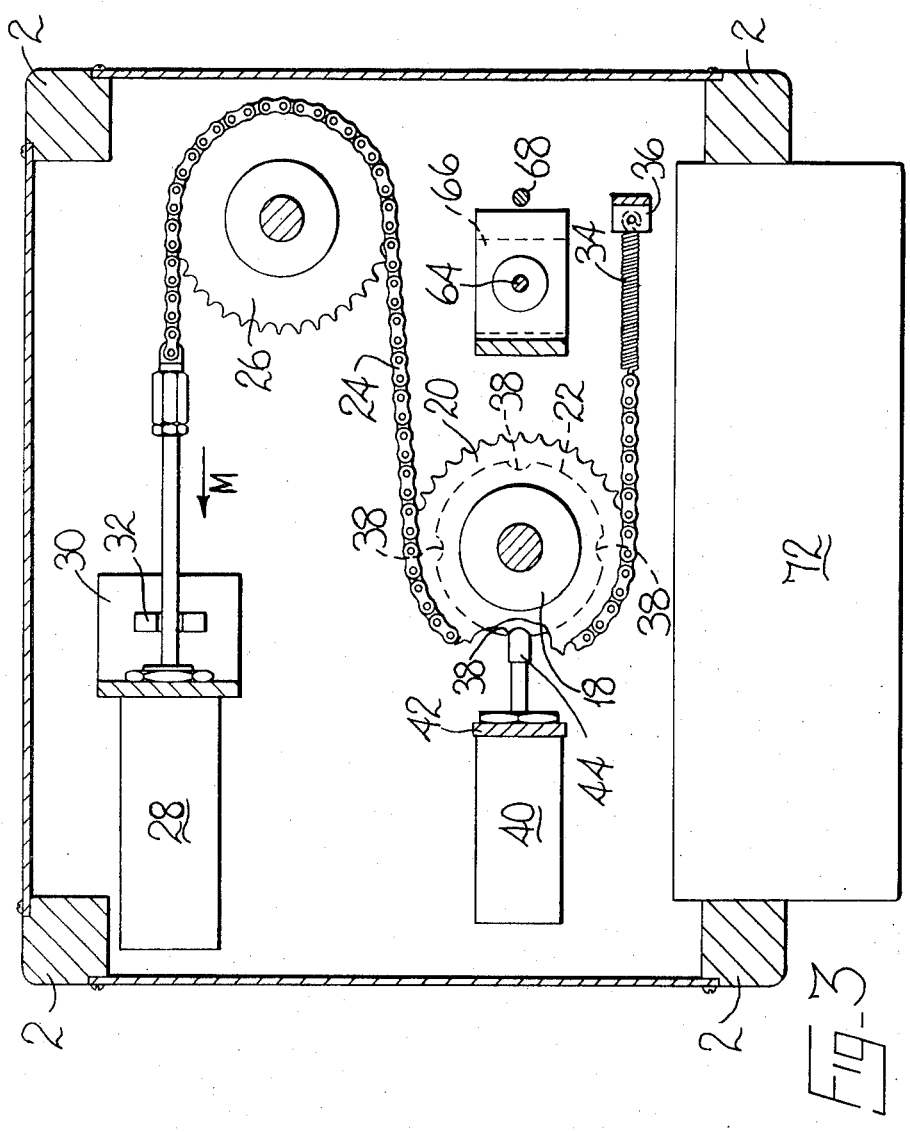
FIG. 3 is a plan view of the part of the machine shown in FIGS. 1 and 2 located below the base plate thereof.
Figure 4:
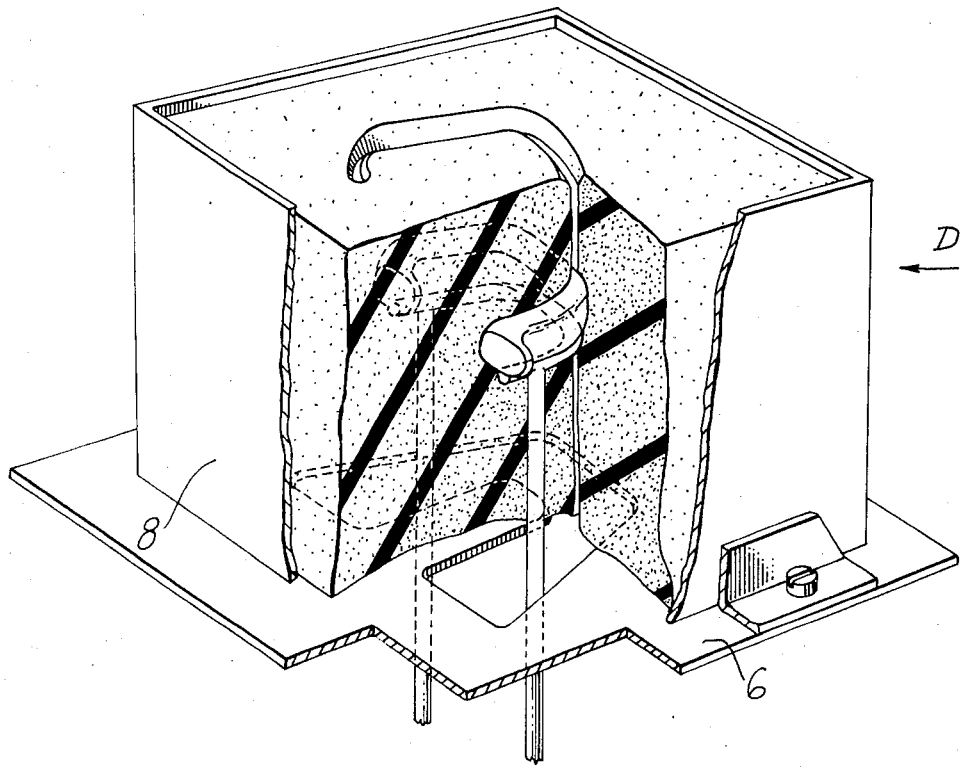
FIG. 4 is a perspective view box 8 at station D, showing operation of ejector 60.
Figure 5:
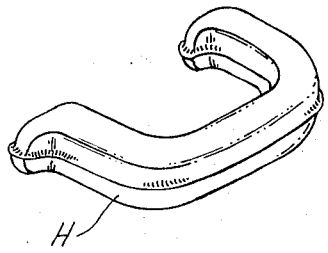
FIG. 5 is a perspective view of a cup handle before deseaming.
Figure 6:
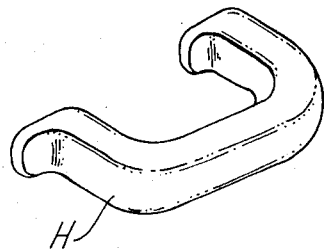
FIG. 6 is a perspective view of a cup handle after deseaming.

The turntable 6 is arranged to index the boxes 8 between four stations A, B, C and D of the machine (see FIG. 1 for B and D and FIG. 2 for A and C) by making successive turns of one quarter of a revolution. To achieve a one quarter revolution motion of the turntable 6, the cylinder 28 operates to move its piston rod in the direction of arrow M (see FIG. 3) thereby pulling chain 24 and causing cog wheels 20 and 26 to rotate, thus rotating the turntable 6, and stretching spring 34, the sprag clutch 18 allowing the rotation of the turntable 6 and the stop 32 limiting the motion. The stroke of the cylinder 28 is arranged to cause a quarter revolution of the turntable 6 but the positioning disc 22 ensures that the turntable 6 stops at its correct position. The disc 22 rotates with the turntable 6 and has four notches 38 arranged symmetrically around its periphery. A pneumatic cylinder 40 is mounted on a bracket 42 which depends from the base plate 4 and acts to urge a plunger 44 into the notches 38. The notches 38 taper so that once the turntable 6 is approximately in its correct position the plunger 44 pressing on the periphery of the disc 22 acts to bring the turntable 6 to its correct position. This cylinder 40 and the plunger 44 could be utilised as a fail-safe mechanism to prevent operation of the machine unless the turntable 6 is in its correct position. With the turntable held in its correct position by the plunger 44, the release of pressure in cylinder 28 allows the spring 34 to contract pulling the chain 24 and allowing cog wheel 20, cog wheel 26 and cylinder 28 to return to their original configuration (sprag clutch 18 allowing the motion without rotation of the turntable 6).

Stations A and B of the machine are stations at which an operator of the machine can either load or unload cup handles to be operated upon from the sponges 10. At station C is located a pusher member 46, above the turntable 6 and supported by two rods 48. The pusher member 46 is formed in the profile shape of the cup handles to be operated upon so that it conforms to the cross-section configuration of the passageways 12, and is arranged to push cup handles into the passageways 12. The rods 48 are secured to the piston rod 49 of a pneumatic cylinder 50 mounted on a gantry 52 which is secured to the base plate 4. The piston rod 49 is provided with a guide rod 54 which passes through a guider 56 on the gantry 52 and is connected to the piston rod 49 by means of a strut 58. The guide rod 54 acts to ensure that operation of the cylinder 50 brings the pusher member 46 down into the passageway 12 in a sponge 10 at station C of the machine.

Located at station D of the machine and below the leval of the turntable 6 is an ejector member 60 supported by two rods 62 which are secured to the piston rod 64 of a pneumatic cylinder 66 mounted below the base plate 4. The piston rod 64 is provided with a guide rod 68 connected to it by a strut 70, which guide rod passes through a guide hole in the base plate 4. The ejector member 60 is formed in the same shape as the pusher member 46 and is arranged to pass through a hole in the turntable 6 and push a cup handle out of the passageway 12 of a sponge 10 at station D of the machine.

The machine also comprises a control box 72 which contains a control cam shaft (not shown) of the machine and valves of the pneumatic circuit thereof.

In the operation of the machine, shown in the accompanying drawings, the operator takes a cup handle H which requires the seams to be removed therefrom and places it in the entrance portion 14 of a sponge 10 at either station A or B. He does this while the clay forming the handle H is still in a wet condition so that the clay can be worked without cracking or flaking. The entrance portion 14 aids the operator in locating and orientating the handle correctly on the sponge. The sponges 10 have been dampened before being placed in the boxes 8 and each has a passageway 12 of suitable cross-sectional configuration for the handle H to be operated upon. The machine then automatically rotates the turntable 6, to bring the handle H to station C by operation of cylinder 28, following a pre-arranged sequence initiated by the control cam shaft in control box 72, the cylinder 40 operating to withdraw the plunger 44 to allow rotation of the turntable 6 to take place.

At station C, cylinder 50 operates to bring the pusher member 46 downwards contacting handle H and pushing it into passageway 12. As the handle H is pushed through the passageway, the seams thereof rub against opposed walls of the passageway and material is removed from them thereby. Material is also removed from the leading edge of handle H by this action causing the handle H to become unsymmetrical about the plane defined by the positions the seams occupied. Completion of the stroke of the cylinder 50 leaves the handle H approximately one-half inch from the bottom of the sponge 10 where it is retained in the passageway 12 by pressure from the walls thereof. The cylinder 50 now operates to withdraw the pusher member 46 from the passageway 12 to its original position.

Next, in the operation of the machine, the cylinder 28 operates to rotate the turntable 6 to bring the sponge 10 containing the handle H to station D. At station D the cylinder 66 operates to move the ejector member 60 into the passageway 12 contacting the handle H and pushing it back through the passageway 12 to the entrance portion 14 where the handle H comes to rest as the cylinder 66 completes its stroke. As the handle H is pushed back through the passageway 12, material is removed from the leading edge thereof, which was previously the trailing edge, so that the handle H becomes again substantially symmetrical about the plane defined by the positions which the seams occupied. The cylinder 66 then operates to remove the ejector member 60 from the passageway 12. The cylinder 28 then operates to rotate the turntable 6 to bring handle H to station A where the operator lifts the handle from the entrance portion 14 and removes it for attachment to a cup.

The machine shown in the accompanying drawings has been found to operate satisfactorily requiring little skill in an operator since all that is required is to place handles on the sponges 10 and then remove them when they have been operated upon, the handles treated are substantially symmetrical about the plane defined by the positions occupied by the seams and are not distored from the profile shape into which the handles were moulded. The operation of the machine causes the cup handle to be passed through at least part of a passageway in a sponge and back again so that an equal amount of clay is removed from both its leading and its trailing edge and the treated handle is substantially symmetrical about the plane defined by the position which the seams occupied.

We claim:

1. A deseaming machine for ceramic cup handles comprising a support for sponge material or the like, opposed walls of which sponge material define a passageway therein which has a cross-sectional configuration conforming to the profile shape of a cup handle, a pusher member shaped to conform to the cross-sectional configuration of the passageway, means for moving the pusher member so that the pusher member pushes a cup handle placed on the sponge material at the entrance to the passageway into the passageway so that the cup handle is carried through at least part of the passageway rubbing against the opposed walls so that seams on the cup handle are substantially removed, an ejector member shaped to conform to the cross-sectional configuration of the passageway, and means for moving the ejector member so that it pushes the cup handle back out of the passageway and withdraws to leave the handle on the sponge material so that the cup handle is carried back through the part of the passageway through which it was pushed by the pusher member and can be readily unloaded from the sponge material.

2. A machine according to claim 1 wherein the support for sponge material or the like is mounted on a turntable so that it can be indexed to stations of the machine adjacent the pusher member and the ejector member respectively.

3. A machine according to claim 2 wherein a plurality of supports for sponge material or the like are mounted on the turntable so positioned that, while the pusher member pushes a cup handle into the passageway at one of the supports, the ejector member pushes a cup handle out of the passageway at another of the supports.

4. A machine according to claim 3 wherein each passageway of the sponge material or the like is provided with a tapering entry portion which facilitates the positioning of a cup handle to be operated upon by the machine in alignment with the passageway.

* * * * *